(12) United States Patent
Kikitsu et al.

(10) Patent No.: US 8,681,454 B2
(45) Date of Patent: Mar. 25, 2014

(54) PATTERNED MEDIUM AND METHOD OF MANUFACTURING THE SAME

(75) Inventors: Akira Kikitsu, Yokohama (JP); Yoshiyuki Kamata, Tokyo (JP); Masatoshi Sakurai, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 50 days.

(21) Appl. No.: 13/424,266

(22) Filed: Mar. 19, 2012

(65) Prior Publication Data

US 2012/0177948 A1 Jul. 12, 2012

Related U.S. Application Data

(62) Division of application No. 12/713,022, filed on Feb. 25, 2010, now Pat. No. 8,153,205.

(30) Foreign Application Priority Data

Feb. 26, 2009 (JP) .................................. 2009-044002

(51) Int. Cl.
*G11B 5/82* (2006.01)
*G11B 5/09* (2006.01)

(52) U.S. Cl.
USPC ............................................. 360/135; 360/48

(58) Field of Classification Search
None
See application file for complete search history.

(56) References Cited

U.S. PATENT DOCUMENTS

| | | | |
|---|---|---|---|
| 6,381,088 B1 * | 4/2002 | Despain et al. | 360/77.06 |
| 7,394,622 B2 * | 7/2008 | Gage et al. | 360/135 |
| 2006/0012904 A1 | 1/2006 | Naruse et al. | |
| 2008/0042319 A1 | 2/2008 | Ando et al. | |
| 2011/0194213 A1 * | 8/2011 | Gao et al. | 360/319 |

FOREIGN PATENT DOCUMENTS

| | | |
|---|---|---|
| JP | H11-110749 | 4/1999 |
| JP | 2001-126323 | 5/2001 |
| JP | 2004-192733 | 7/2004 |
| JP | 2008-012858 | 1/2008 |
| JP | 2008-198335 | 8/2008 |
| JP | 2008-251141 | 10/2008 |
| JP | 2009-143221 | 2/2009 |
| JP | 2009-083195 | 4/2009 |
| JP | 2009-208240 | 9/2009 |

OTHER PUBLICATIONS

Office Action issued Jun. 22, 2010, in corresponding Japanese Application No. 2009-044002.

* cited by examiner

*Primary Examiner* — Daniell L Negron
(74) *Attorney, Agent, or Firm* — Knobbe Martens Olson & Bear LLP

(57) ABSTRACT

According to one embodiment, a method of manufacturing a patterned medium includes depositing a magnetic recording layer and applying an ultraviolet curable resin on both surfaces of a medium substrate, pressing a first resin stamper and a second resin stamper each including patterns of recesses and protrusions, corresponding to a patterned medium, against both surfaces of the medium substrate in such a manner that a direction from a center of the medium substrate toward a center of the first resin stamper is off-oriented from a direction from the center of the medium substrate toward a center of the second resin stamper to imprint the patterns of recesses and protrusions on the ultraviolet curable resin, and irradiating the ultraviolet curable resin with an ultraviolet ray through each of the first and second resin stampers to cure the ultraviolet curable resin.

4 Claims, 3 Drawing Sheets

PATTERNED MEDIUM AND METHOD OF MANUFACTURING THE SAME

CROSS-REFERENCE TO RELATED APPLICATIONS

This application is a divisional of U.S. patent application Ser. No. 12/713,022, filed Feb. 25, 2010, titled "PATTERNED MEDIUM AND METHOD OF MANUFACTURING THE SAME," which is based upon and claims the benefit of priority from Japanese Patent Application No. 2009-044002, filed Feb. 26, 2009, the entire contents of each of which are incorporated herein by reference.

BACKGROUND

1. Field

One embodiment of the present invention relates to a patterned medium and a method of manufacturing the patterned medium.

2. Description of the Related Art

In recent years, patterned medium has been studied as a technique for improving the recording density of hard disk drives (HDD). The patterned medium includes a discrete track medium (DTM) and a bit patterned medium (BPM). The DTM comprises patterns obtained by processing a magnetic recording layer in units of recording tracks. This serves to suppress the interference between the adjacent tracks, thus improving recording density. The BPM comprises patterns obtained by processing a magnetic recording layer in units of recording bits. This serves to increase the volume of a magnetization reversal unit compared to that of conventional media to suppress a thermal fluctuation phenomenon, thus improving the recording density.

Both the DTM and BPM need to be recordable on both surfaces of the medium, like current magnetic recording media, in order to add a high value to a drive. To achieve this, a magnetic recording layer needs to be processed on both surfaces of the medium.

The DTM or BPM is manufactured as follows, for example. First, a Si substrate is coated with a resist layer to which fine patterns are written by electron beam writing. The resist is developed to produce a master plate with patterns of recesses and protrusions of the resist layer. A Ni film is sputter-deposited on the master plate, and a Ni plated layer is deposited on the Ni film. The Ni film and the Ni plating layer are peeled off to produce a Ni stamper. The Ni stamper is set to an injection molding machine. The resin is molded using the Ni stamper as a mold to produce a replica of the stamper made of the resin (resin stamper). A magnetic recording layer is deposited on both surfaces of a medium substrate by a general method, and an ultraviolet (UV) curable resin layer is coated to both surfaces of the medium substrate. The resin stampers are pressed against both surfaces of the UV resin layer on the medium. The UV curable resin is then irradiated with UV through the resin stampers on both surfaces to be cured. The resin stampers are then peeled off to form etching mask patterns of the UV curable resin on both surfaces of the medium. The magnetic recording layer is etched by reactive ion etching (RIE) or ion milling through the patterns of the UV curable resin as etching masks. The recesses in the etched magnetic recording layer are filled with a nonmagnetic material, as needed, to flatten the surface of the magnetic recording layer as required. An overcoat layer is deposited on the magnetic recording layer, and a lubricant is coated to the overcoat layer to manufacture a DTM or BPM.

The inventors studied two-side processing of patterned medium based on the above-described process, and encountered a phenomenon that an error rate is locally degraded on both surfaces of the medium. The local degradation in error rate was also found in a patterned medium with only one surface processed, but it was due to the defect of shape of grooves/bits in the stamper or process damage. However, the local degradation in error rate shown in the two-side processed medium showed a tendency different from that caused by the defect of track/bit shape or process damage. Thus, the inventors assumed that the local degradation in error rate is inherent in the patterned medium with both surfaces processed and is caused by deviation between the center of the medium substrate and the center of the stamper.

Jpn. Pat. Appln. KOKAI Publication No. 2004-192733 discloses a method of evaluating an eccentric discrete medium without the need for tracking servo control. Jpn. Pat. Appln. KOKAI Publication No. 2004-192733 discloses that a discrete track medium is formed such that the center of tracks deviates from the center of the medium and that also when the discrete track medium is installed in an evaluation apparatus, the center of the tracks deviates from the center of rotation of the motor. The particular evaluation technique takes the eccentricity of the discrete medium into account, but does not prevent the local degradation in error rate resulting from the two-side processing of the medium as described above.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, there is provided a method of manufacturing a patterned medium, comprising: depositing a magnetic recording layer and then applying an ultraviolet curable resin on both surfaces of a medium substrate; pressing a first resin stamper and a second resin stamper each comprising patterns of recesses and protrusions corresponding to recording tracks or recording bits and servo information in a patterned medium to be manufactured against both surfaces of the medium substrate in such a manner that a direction of a vector from a center position of the medium substrate toward a center position of the first resin stamper is off-oriented from a direction of a vector from the center position of the medium substrate toward a center position of the second resin stamper in order to imprint the patterns of recesses and protrusions on the ultraviolet curable resin; and irradiating the ultraviolet curable resin with an ultraviolet ray through each of the first and second resin stampers to cure the ultraviolet curable resin.

According to another embodiment of the invention, there is provided a patterned medium comprising: a medium substrate; and a magnetic recording layer with patterns of recesses and protrusions forming recording tracks or recording bits and servo information on both surfaces of the medium substrate, wherein a direction of a vector from a center position of the medium substrate toward a center position of the recording tracks or bits on one surface of the medium substrate is off-oriented from a direction of a vector from the center position of the medium substrate toward a center position of the recording tracks or bits on the other surface.

The inventors closely studied manufacturing processes while varying conditions for each stage in order to suppress local degradation in error rate in a patterned medium with both surfaces processed. As a result, the inventors have concluded that the local degradation in error rate is caused in pressing resin stampers against both surfaces of a medium substrate. Specifically, the inventors have found that when an UV curable resin is applied to both surfaces of a medium substrate on which a magnetic recording layer deposited, resin stampers are pressed against both surfaces of the medium substrate, and the UV curable resin is irradiated with UV through the resin stampers on both surfaces to be cured, then the local degradation in error rate is improved if directions from the center position of the medium substrate toward the resin stampers are off-oriented from each other on both surfaces.

Figure 1:
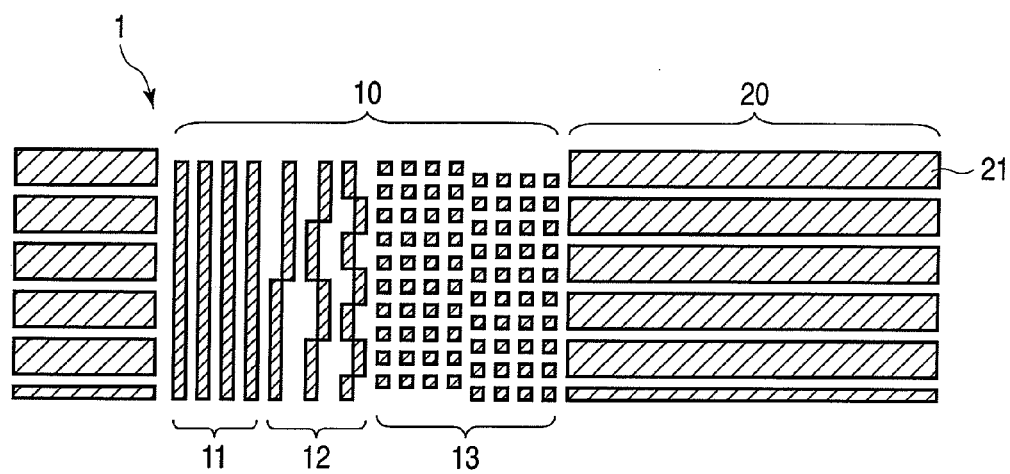
FIG. 1 is a plan view showing a discrete track medium (DTM) along the circumferential direction.
Figure 2:
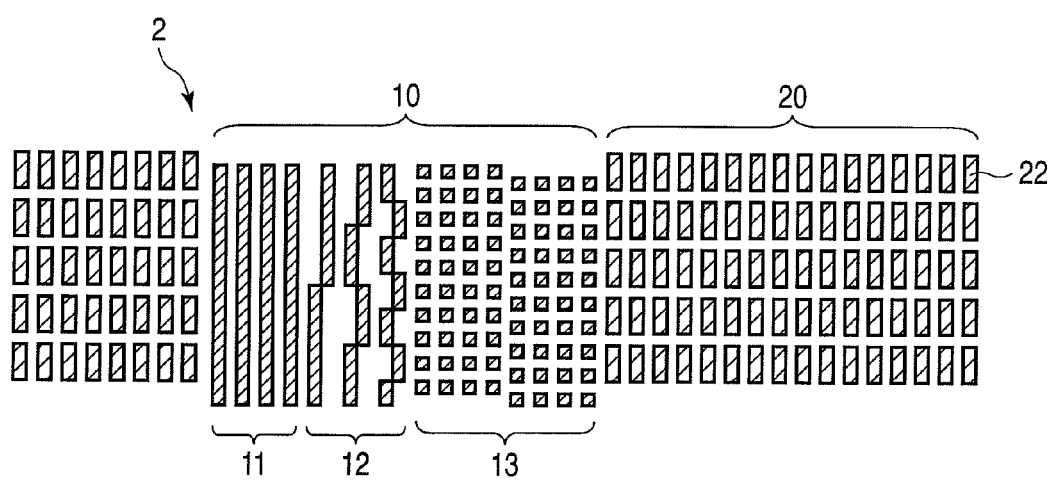
FIG. 2 is a plan view showing a bit pattern medium (BPM) along the circumferential direction.

FIG. 1 is a plan view showing a discrete track medium (DTM) along the circumferential direction. As shown in FIG. 1, servo areas 10 and data areas 20 are alternately arranged along the circumferential direction of a discrete track medium (DTM) 1. An area composed of a set of the servo area 10 and the data area 20 is called a sector. A large number of sectors are formed on a recording surface. A preamble section 11, an address section 12, a burst section 13, and the like are formed in the servo area as servo information for positioning a magnetic head on a track. Separated discrete tracks 21 are concentrically formed in the data area 20. User data is recorded in the discrete tracks FIG. 2 is a plan view showing a bit patterned medium (BPM) along the circumferential direction. As shown in FIG. 2, the servo area 10 is configured similarly to that shown in FIG. 1. Separated magnetic dots 22 are formed in the data area 20. User data is recorded in each of the magnetic bits 22, each corresponding to one bit.

Figure 3:
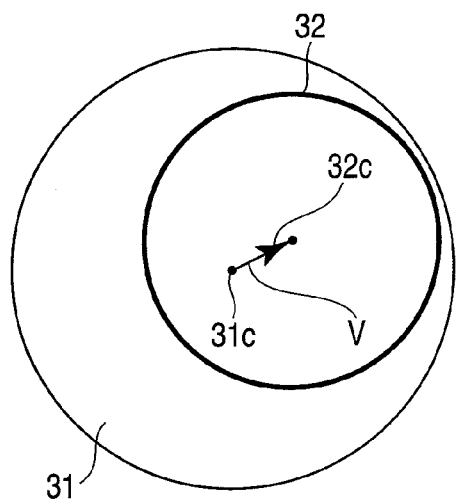
FIG. 3 is a diagram schematically showing the relationship between the center position of a medium substrate and the center position of a resin stamper pressed against one surface of the medium substrate.

FIG. 3 schematically shows the relationship between the center position of a medium substrate and the center position of a resin stamper pressed against one surface of the medium substrate. FIG. 3 shows a track 32 on a resin stamper pressed against one surface of a medium substrate 31. The center position 32c of the track 32 deviates from the center position 31c of the medium substrate 31. A vector (v) is shown which extends from the center position 31c of the medium substrate 31 toward the center position 32c of the track 32 on the resin stamper. The direction of the vector (v) is upward rightward in FIG. 3. The length of the vector (v) corresponds to the magnitude of the deviation.

Figure 4:
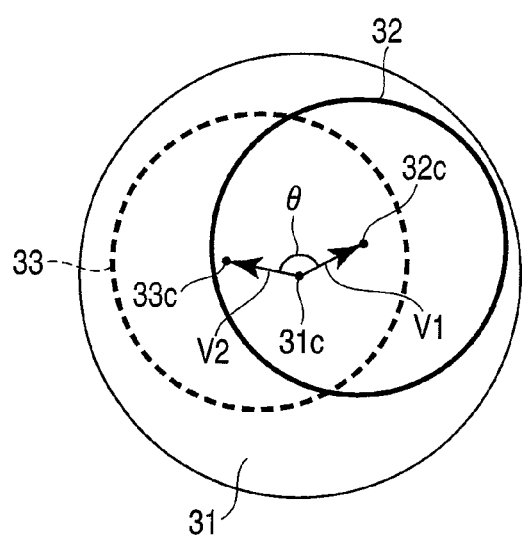
FIG. 4 is a diagram schematically showing the relationship between the center position of a medium substrate and each of the center positions of a first resin stamper and a second resin stamper pressed against the both surfaces of the medium substrate in the present invention.

FIG. 4 schematically shows the relationship between the center position of a medium substrate and each of the center positions of a first resin stamper and a second resin stamper pressed against the both surfaces of the medium substrate in the present invention. FIG. 4 shows a track 32 on the first resin stamper pressed against the front surface of the medium substrate 31 and a track 33 on the second resin stamper 32 pressed against the back surface of the medium substrate 31. The direction of a vector v1 from the center position 31c of the medium substrate 31 toward the center position 32c of the track 32 on the first resin stamper is off-oriented from that of a vector v2 from the center position 31c of the medium substrate 31 toward the center poison 33c of the track 33 on the second resin stamper. The angle between the direction of the vector v1 and the direction of the vector v2 is denoted by θ.

The inventors have found that in order to eliminate local degradation in error rate in a patterned medium with both surfaces processed, the angle θ between the directions of the two vectors v1 and v2 may be set to a somewhat large value, specifically 5 degrees or more.

In general, the center position of the medium substrate is required to conform to the center position of the track as well as possible. The reason for this requisition is that the deviation between the center positions results in primary eccentricity of the tracks, which adversely affects precise tracking control of the magnetic head. In the patterned medium according to the present invention, the local degradation in error rate has been successfully improved by using a technique that is contradictory to the above-described general requisition. However, when the lengths of the vectors v1 and v2 exceed 40 μm, the deviation is excessively significant, making precise tracking operations difficult.

It is found that, although the degree and manner of the local degradation in error rate differ between a DTM and BPM, the local degradation in error rate can be improved in either medium by displacing the direction of the vector from the center position of the medium substrate toward the center position of the first resin stamper from the direction of the vector from the center position of the medium substrate toward the center position of the second resin stamper.

The mechanism with which the effect of the present invention is exerted has not been clarified. However, since the present invention is available to both the DTM and BPM, the mechanism is expected to be based on processed patterns sectioned in the servo area and the data area as shown in FIGS. 1 and 2.

An assumed mechanism will be described below. In the DTM shown in FIG. 1, from the viewpoint of macroscopic structural feature, whole patterns of the discrete tracks 21 in the data area has a feature of extended structure along the circumferential direction, while whole patterns of the preamble sections 11 and the like in the servo area has a feature of extended structure along the radial direction. In the BPM shown in FIG. 2, patterns of the separate several thousands of magnetic dots 22, each corresponding to a bit, are formed so as to regularly array, which can be considered to have a feature of extended structure along the circumferential direction as the case of the discrete tracks in DTM. The servo areas have a similar configuration in both the BPM and DTM.

When cured during imprinting, a UV curable resin is inevitably contracted. The contract is likely to result in stress along the direction of the above mentioned macroscopic structural feature. Furthermore, as shown in FIGS. 1 and 2, since sectors have such a structure that the macroscopic feature in the data areas extending along the circumferential direction are separated by the servo areas, the stress is expected to act independently on each of the sectors. The acting direction of the stress varies depending on the state of the patterns and cannot simply be determined. However, if for example, stress acting toward the center is generated, each sector is pulled toward the center. The action of such stress causes the patterns made of the UV resin to be distorted, though the distortion is insignificant.

Figure 5:
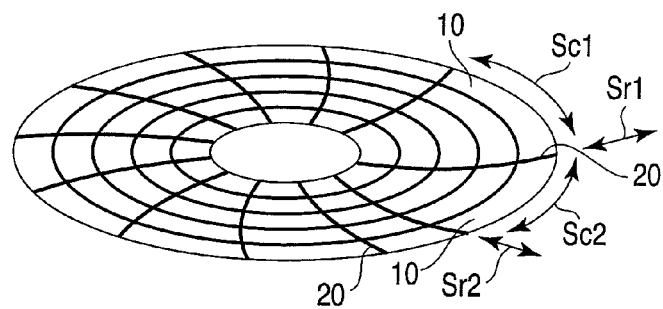
FIG. 5 is a diagram showing exemplary distortions that may occur in patterns of a UV resin.

FIG. 5 shows exemplary distortions that may occur in the patterns made of the UV resin. As shown in FIG. 5, the data areas 10 are distorted in the circumferential direction as denoted by arrows Sc1 and Sc2. The servo areas 20 are distorted in the radial direction as denoted by arrows Sr1 and Sr2. Since the data areas 10 are separated from one another by the servo areas 20, the circumferential distortions Sc1 and Sc2 act independently. As a result, the degree of the distortion varies among the sectors. It is conceivable that such random distortions may cause the local degradation in error rate.

Figure 6:
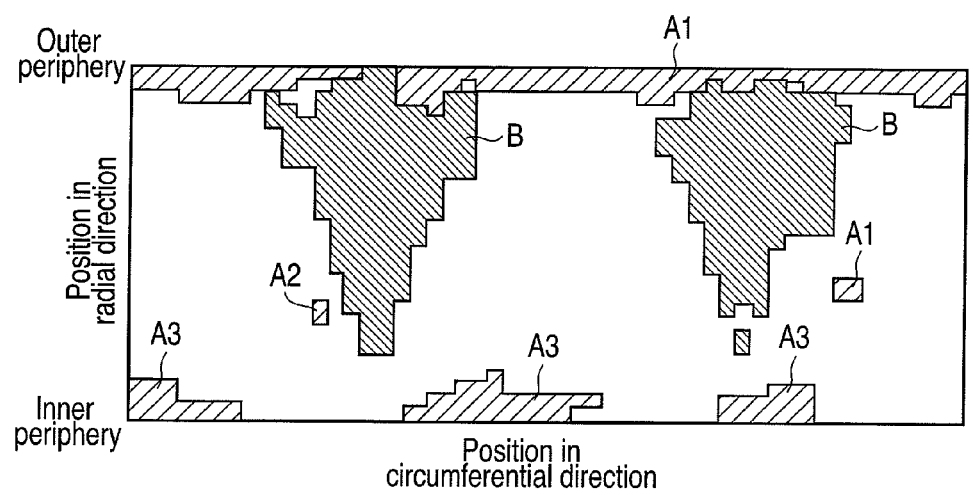
FIG. 6 is a diagram schematically showing the distribution of an error rate caused in a patterned medium.

FIG. 6 schematically shows the distribution of the error rate in a pattern medium. The horizontal axis indicates the position in the circumferential direction. The vertical axis indicates the position in the radial direction. A bit error rate (bER) is evaluated for each sector, and sectors with a bER of larger than $10^{-3}$ are represented in the figure.

Portions (A1 to A3) represented by one type of hatching show sectors with a degraded bER observed in a patterned medium with one surface processed. The hatched portions may be more specifically classified into bER degraded sectors (A1) resulting from defective imprinting in the outer peripheral portion, local bER degraded sectors (A2) resulting from missing patterns during fabrication process, bER degraded sectors (A3) resulting from defective imprinting and poor positioning accuracy, and the like. In the actual case, unlike in the case of FIG. 6, not all of the bER degraded sectors are always present. Any one of the bER degraded sectors may be solely present, or a combination of two types of bER degraded sectors may be present. It should be noted that the cause of the degradation in error rate may not be always identified solely, and the degradation may result from a combination of plural causes.

Portions (B) represented by other type of hatching show bER degraded sectors newly occurred in a patterned medium with both surfaces processed. The bER degraded sectors classified in B cover a slightly wider range than the bER degraded sectors A1 to A3 and may have rotational symmetry through 180 degrees. The inventors have repeated various experiments aiming at reducing the bER degraded sectors classified in B. The inventors have found that the aim can be achieved by displacing the center positions of the two resin stampers on both surfaces with respect to the center position of the medium substrate and thus attained the present invention.

Since a medium for a hard disk drive (HDD) has a doughnut structure with a center hole, distortions act easily in the radial or circumferential direction of the medium and the medium is deformed most significantly when force is applied in the radial or circumferential direction. Furthermore, if the resin stamper is pressed against one surface of the medium substrate, the distortions of the patterns are most significant in the direction of the vector (v) connecting the center position of the medium substrate and the center position of the track together. When the two resin stampers are pressed against the both surfaces of the medium substrate, if the direction of the vector connecting the center position of the medium substrate to the center position of the resin stamper on one surface of the medium substrate is the same as or similar to that of the vector connecting the center position of the medium substrate to the center position of the resin stamper on the other surface, the distortions of the patterns are more significant in the direction of the vector (V).

In contrast, if the direction of the vector v1 from the center position 31c of the medium substrate 31 toward the center position 32c of the track 32 on the first resin stamper is off-oriented with certain degrees from that of the vector v2 from the center position 31c of the medium substrate 31 toward the center position 33c of the track 33 on the second resin stamper as shown in FIG. 4, then the distortions acting on the patterns cancel each other. Hence, the distortions of the patterns as a whole are reduced. That is, the direction to which stress acts varies between the opposite surfaces of the medium substrate and the direction to which the stress acts easily are different between the opposite surfaces of the medium substrate. This is expected to serve to suppress the distortions caused by the curing of the UV resin.

EXAMPLES

Example 1

Discrete track media (DTM) were manufactured as follows. The DTM to be manufactured in the present example comprise discrete tracks with a width of 60 nm and a track pitch of 100 nm or 80 nm.

A Si substrate was coated with a resist to which patterns corresponding to the DTM to be manufactured were written by electron beam drawing. The resist was then developed to produce a master plate with patterns of recesses and protrusions of the resist. A Ni film was sputter-deposited on the master plate, and a Ni plated layer was deposited on the Ni film. The Ni film and the Ni plating layer were peeled off to produce a Ni stamper. The Ni stamper was set to an injection molding machine. The resin was molded using the Ni stamper to produce a resin stamper.

A magnetic recording layer and a carbon hard mask were deposited on both surfaces of a recording medium substrate. A UV curable resin was applied thereto. The resin stampers were then pressed against both surfaces for imprinting.

At this time, for one sample (Conventional Example), in accordance with the conventional method, first and second resin stampers were pressed in the same manner in the direction toward the center hole of each resin stamper from the center of the medium substrate using an alignment pin. Thus, the directions from the center position of the medium substrate toward the center positions of the first and second resin stampers on both surfaces were conformed with each other.

In another sample (Example 1), in accordance with the method according to the present invention, first and second resin stampers were independently pressed against an alignment pin in the direction toward the center hole of each resin stamper from the center of the medium substrate, and the direction from the center position of the medium substrate toward the center position of the first resin stamper was visually off-oriented from the direction from the center position of the medium substrate to the center position of the second resin stamper by approximately 30 degrees.

For each of the samples, the UV curable resin was irradiated with UV through the resin stampers on both surfaces to be cured. The resin stampers were peeled off to form etching mask patterns of the UV curable resin on both surfaces of the medium substrate.

Residual resin in the recessed portion were removed by oxygen RIE, and the carbon hard mask was etched to transfer the UV curable resin patterns to the carbon hard mask on both surfaces. The magnetic recording layer was irradiated with Ar ions to be etched out on both surfaces. Carbon was filled in the recesses on the magnetic recording layer by sputtering, and then the carbon was irradiated with Ar ions to be flattened on both surfaces. A lubricant was applied to the carbon on both surfaces to manufacture DTM. The DTM of Conventional Example and Example 1 were installed in a read/write tester and evaluated for bER.

In the DTM of Conventional Example in which the directions from the center position of the medium substrate toward the center positions of the first and second resin stampers on both surfaces were conformed with each other, the local bER degraded sectors (B) resulting from two-side processing were observed as schematically shown in FIG. 6, regardless of whether the track pitch was 100 nm or 80 nm.

In contrast, in the DTM of Example 1 in which the direction of the vector from the center position of the medium substrate toward the center position of the first resin stamper was off-oriented, by approximately 30 degrees, from the direction of the vector from the center position of the medium substrate toward the center position of the second resin stamper, the bER degraded sectors like A1, A2, and A3 resulting from one-side processing were observed. However, the bER degraded sectors (B) resulting from two-side processing, which can be clearly distinguished from those resulting from one-side processing, were not observed.

Furthermore, bit patterned media (BPM) were manufactured as follows. The BPM to be manufactured in the present example comprises magnetic dots separated from one another at a bit pitch in the circumferential direction of 30 nm and a bit length of 10 nm, and has a track pitch of 100 nm or 80 nm.

Like the above description, a Si substrate was coated with a resist to which patterns corresponding to the BPM were written by electron beam drawing and the resist was developed, and then a Ni stamper was produced, and further a resin stamper was produced. Like the above description, a sample of Conventional Example and a sample of Example 1 were produced as follows. For the sample of Conventional Example, in UV imprinting, first and second resin stampers were pressed in the same manner in the direction toward the center hole of each resin stamper from the center of the medium substrate using an alignment pin, and thus, the directions from the center position of the medium substrate toward the center positions of the first and second resin stampers on both surfaces were conformed with each other. Thus, a BPM was manufactured. For the sample of Example 1, in UV imprinting, first and second resin stampers were independently pressed against an alignment pin in the direction toward the center hole of each resin stamper from the center of the medium substrate, and the direction from the center position of the medium substrate toward the center position of the first resin stamper was visually off-oriented from the direction from the center position of the medium substrate to the center position of the second resin stamper by approximately 30 degrees. Thus, a BPM was manufactured.

Experiments were performed in which all bits were magnetized in one direction and then all-one pattern was read out. Thus, the BPM of Conventional Example and the BPM of Example 1 were checked for bER, although the experiments do not estimate the bit error rate in a strict sense. In this case, a threshold for bER was set to $10^{-4}$. In the BPM of Conventional Example in which the directions from the center position of the medium substrate toward the center positions of the first and second resin stampers on both surfaces were conformed with each other, the local bER degraded sectors (B) resulting from two-side processing were observed as schematically shown in FIG. 6. In contrast, in the BPM of Example 1 in which the direction of the vector from the center position of the medium substrate toward the center position of the first resin stamper was off-oriented, by approximately 30 degrees, from the direction of the vector from the center position of the medium substrate toward the center position of the second resin stamper, the bER degraded sectors (B) resulting from two-side processing were not observed. In this manner, also in the bit patterned medium (BPM), the local degradation in bER resulting from two-side processing can be efficiently suppressed by making the direction from the center position of the medium substrate to the center position of the first resin stamper off-oriented from the direction from the center position of the medium substrate to the center position of the second resin stamper.

Example 2

Discrete track media (DTM) with a track pitch of 100 nm were manufactured in the same manner as in Example 1. In this case, to examine the effect of suppressing the local degradation in bER resulting from two-side processing, the off-orientation (angle θ) between the directions of the center positions of the first and second resin stampers with respect to the center position of the medium substrate was set to 5, 15, 30, 60, 90, 120, or 150 degrees. Also, for comparison, a DTM was manufactured with the off-orientation (angle θ) between the directions of the center positions of the first and second resin stampers with respect to the center position of the medium substrate set to zero degree.

Ten DTM were manufactured for each angle θ. The resultant DTM were installed in the read/write tester and thus evaluated for bER. In the present example, a medium was determined to be acceptable when the number of sectors with a bER more than $10^{-3}$ is 10 or less in the area of the medium except for 500 inner peripheral tracks and 500 outer peripheral tracks. Incidentally, when at most three bER degraded sectors are consecutively occur in the circumferential direction or in the track direction, they were determined to be the bER degraded sectors resulting from a transfer error or the like (i.e., the bER degraded sectors correspond to A2 in FIG. 6) and were not counted as the error sector. Table 1 shows the relationship between the angle θ and the number of acceptable media.

TABLE 1

| Angle (degrees) | Number of acceptable media |
| --- | --- |
| 0 | 2 |
| 5 | 7 |
| 15 | 8 |
| 30 | 9 |
| 60 | 10 |
| 90 | 9 |
| 120 | 9 |
| 150 | 10 |

The results in Table 1 indicate that the local degradation in bER resulting from two-side polishing can be suppressed provided that there is off-orientation of 5 degrees or more between the direction of the vector from the center position of the medium substrate toward the center position of the first resin stamper and the direction of the vector from the center position of the medium substrate toward the center position of the second resin stamper.

The above experiments correspond to the results of evaluation of the media manufactured in such a manner that the angle at which the first resin stamper is pressed against the alignment pin is intentionally made different from that at which the second resin stamper is pressed against the alignment pin. However, the direction of the primary eccentricity can be detected based on a tracking error signal (position error signal PES) obtained during tracking evaluation. Each medium was checked for the direction of the primary eccentricity in the tracking error signal. The check results indicate that the direction of the primary eccentricity varied within a range of approximately ±5 degrees from the off-orientation angle set in manufacturing. For a set angle of 5 degrees in Table 1, three rejected media all varied significantly in the direction of the primary eccentricity and had an off-orientation angle θ considered as approximately zero degree. Consequently, the checks results indicate that the local degradation in bER can be suppressed by adjusting the off-orientation angle to 5 degrees or more.

Example 3

Table 2 shows the results of evaluation in which a medium was determined to be acceptable when an acceptance threshold was set that the number of sectors with bER more than $10^{-4}$ is 10 or less.

TABLE 2

| Angle (degrees) | Number of acceptable media |
|---|---|
| 0 | 1 |
| 5 | 5 |
| 15 | 6 |
| 30 | 6 |
| 60 | 8 |
| 90 | 7 |
| 120 | 6 |
| 150 | 8 |

As shown in Table 2, the number of acceptable media decreased for all the angles. However, for all the rejected media, the amount of primary eccentricity was larger than 40 µm. That is, it seems that the larger amount of eccentricity makes the accuracy of the tracking control degraded and makes the error rate degraded. As to media used in, for example, drives for servers for which high-precision control is required, it is necessary not only to manage the off-orientation angle of the resin stampers on both surfaces but also to set the amount of deviation between the center position of the medium substrate and the center position of each of the resin stampers on both surfaces to 40 µm or less. A smaller amount of deviation between the center positions is more preferable. However, an excessively small amount of deviation increases process costs. Thus, to control the amount of deviation between the center positions to less than 0.1 µm is overspec in view of costs.

The strictness of the evaluation should be determined based on the application of the medium, that is, the specifications of a drive assumed by the user. The strictness of the evaluation is not limited based on the technical concept of the present invention.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A patterned medium comprising:
a medium substrate; and
a magnetic recording layer comprising recording tracks or recording bits and servo information comprising patterns of recesses and protrusions on both surfaces of the medium substrate,
wherein a direction of a vector from a center position of the medium substrate toward a center position of the recording tracks or bits on a first surface of the medium substrate is off-oriented from a direction of a vector from the center position of the medium substrate toward a center position of the recording tracks or bits on a second surface, and
wherein an off-orientation angle between the direction of the vector from the center position of the medium substrate toward the center position of the recording tracks or bits on the first surface of the medium substrate and the direction of the vector from the center position of the medium substrate toward the center position of the recording tracks or bits on the second other surface is 5 degrees or more.

2. The patterned medium of claim 1, wherein the patterns of recesses and protrusions in the surfaces of the recording medium substrate have a track pitch equal to or shorter than 100 nm.

3. A patterned medium comprising:
a medium substrate; and
a magnetic recording layer comprising recording tracks or recording bits and servo information comprising patterns of recesses and protrusions on both surfaces of the medium substrate,
wherein a direction of a vector from a center position of the medium substrate toward a center position of the recording tracks or bits on a first surface of the medium substrate is off-oriented from a direction of a vector from the center position of the medium substrate toward a center position of the recording tracks or bits on a second surface, and
wherein a length of the vector from the center position of the medium substrate toward the recording tracks or bits on the first surface of the medium substrate and a length of the vector from the center position of the medium substrate toward the recording tracks or bits on the second surface are from 0.1 µm to 40 µm.

4. The patterned medium of claim 3, wherein the patterns of recesses and protrusions in each of the surfaces of the recording medium substrate have a track pitch of 100 nm or less.

* * * * *